Figure 1:
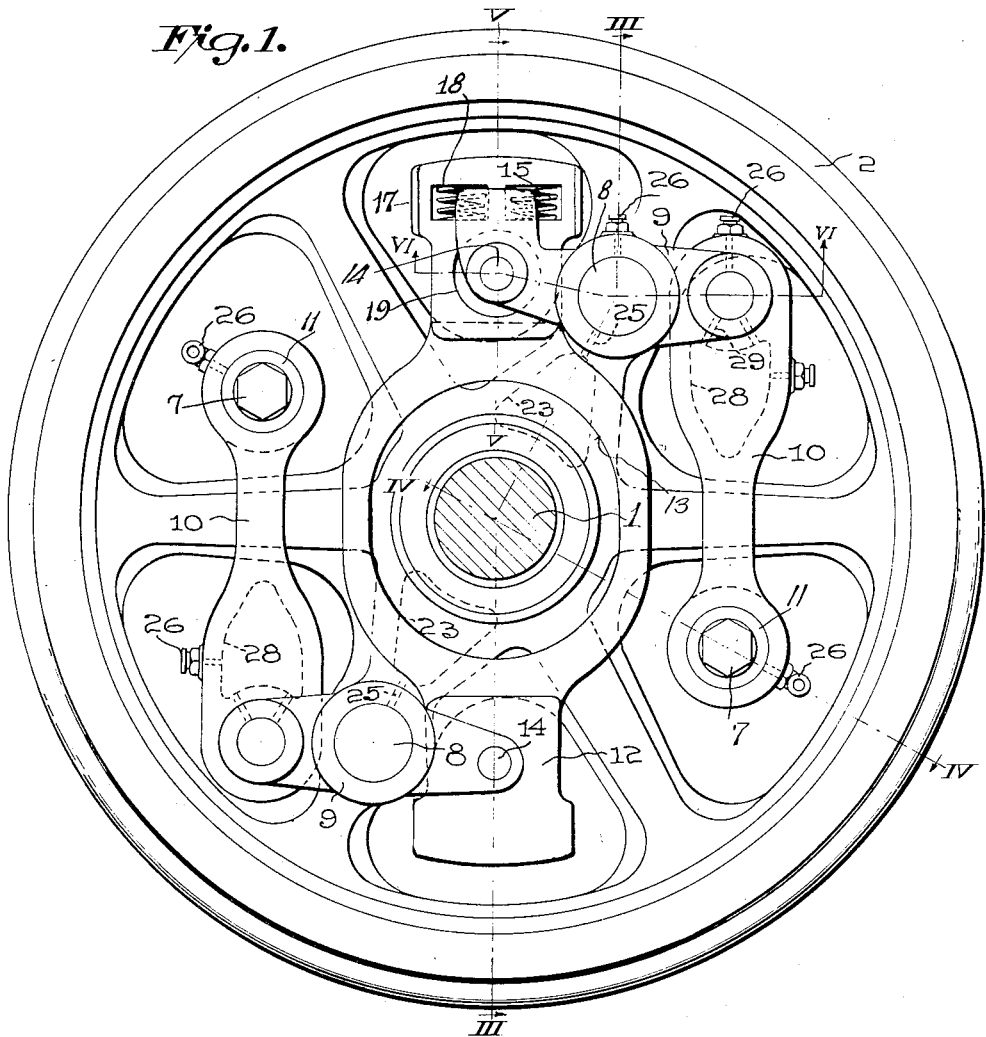

Aug. 30, 1927.

C. N. F. KNAPÈ

1,640,548

LINK DRIVE MECHANISM

Filed Sept. 23, 1924 — 2 Sheets-Sheet 1

WITNESSES:
R. S. Harrison
W. B. Jaspert

INVENTOR
Charles N. F. Knape
BY
Wesley G. Carr
ATTORNEY

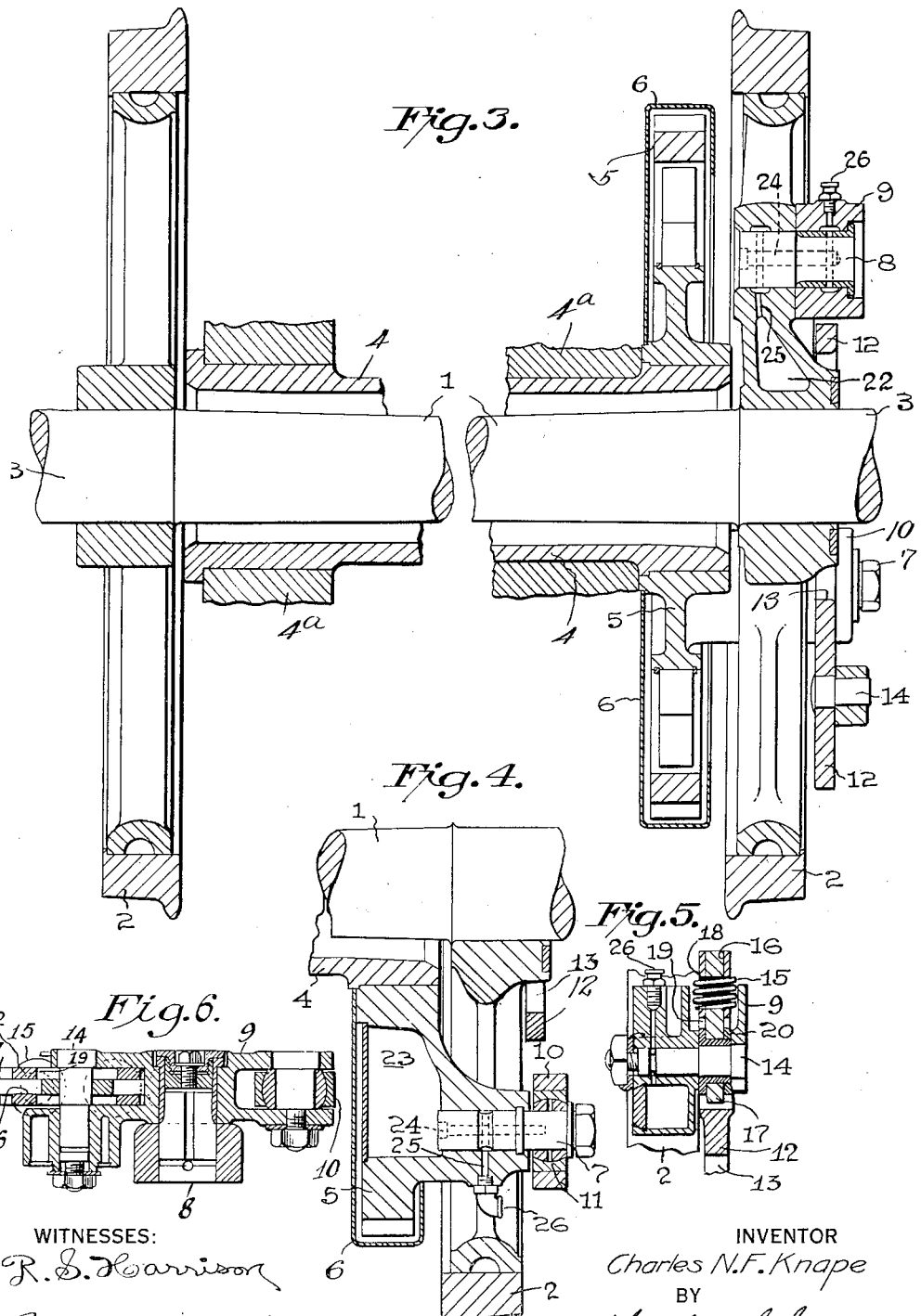

Patented Aug. 30, 1927.

1,640,548

UNITED STATES PATENT OFFICE.

CHARLES N. F. KNAPE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

LINK-DRIVE MECHANISM.

Application filed September 23, 1924. Serial No. 739,242.

My invention relates to drive connections, more particularly to link drive mechanisms for the propulsion of electrically driven railway vehicles.

It is among the objects of my invention to provide a drive mechanism which shall be of simple, compact and durable mechanical construction, which shall constitute a balanced driving connection between the driving and driven elements of railway vehicles and which shall operate efficiently in transmitting torque and in effecting proper load distribution of said elements.

It is a further object of my invention to provide a drive mechanism of the above designated character which shall embody an efficient lubricating system for the several cooperating elements which are rotatably or otherwise movably joined.

It is still a further object of my invention to provide a drive connection for railway vehicles which shall be in static balance and which shall have its parts readily accessible for the removal and renewal of parts.

It is still a further object of my invention to provide a drive mechanism of the above designated character which shall embody flexible connecting links to provide a resilient connection between the driving and driven elements, thereby obviating the need of flexible gear wheels which are commonly utilized for this purpose.

Heretofore it has been proposed to utilize universally flexible link mechanisms for the driving element of railway vehicles, which mechanism is utilized to couple the driving wheels with the driving gears of the motors. Such driving gears are associated with the respective ends of the armature shaft in such manner that there is a flexible link mechanism on both ends of the motor connecting up the driving wheels.

The link mechanism comprises short rocker arms which are mounted on the driving wheels whereby they can be rotated and these are connected at their other end to the link member. The ends of the rocker arms are provided with universally movable rods that are fastened to the gear. These drive links may be concentrically arranged to provide a balanced drive or they may be eccentrically disposed, if desired. The coupling rods are usually provided with double-acting spring elements to permit the link mechanism to follow the changes in position of the driver and also to permit certain springing of the frame or motor armature.

My present invention is similar to this type of construction with the exception that I provide a balanced drive which includes a resilient link embodying a plurality of helical spring elements to provide flexibility for torque which eliminates the need of flexible gears. This flexible link is utilized at one end of the drive axle and is much cheaper than the flexible gear elements without sacrificing resilience for the driving element. The connecting links are so arranged with the resilient link that the drive is in perfect balance as are the driving wheels with such an arrangement.

The lubrication system is such as to provide adequate lubrication of the joints by centrifugal force and the entire unit is of relatively light weight and is generally suitable for high-speed locomotives without the necessity for counter balancing the driving wheels and the drive gear.

Figure 2:
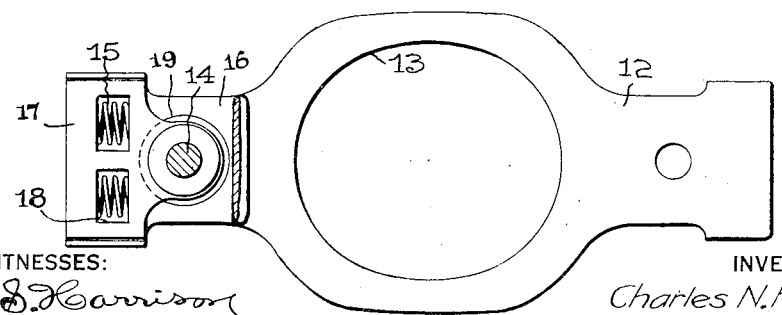

In the accompanying drawings constituting a part hereof and in which like reference characters designate like parts:

Figure 1 is a side elevational view of a flexible drive mechanism embodying the principles of my invention, Fig. 2 is a view in elevation of the flexible link embodied in the drive mechanism of Fig. 1, Fig. 3 is a view, in section taken along the line III—III of Fig. 1, Fig. 4 is a fragmentary view taken in cross section along the line IV—IV of Fig. 1, Fig. 5 is a view in cross section taken along the line V—V of Fig. 1, and Fig. 6 is a sectional view taken along the line VI—VI of Fig. 1.

Referring to Fig. 3, the device therein illustrated, comprises a wheel axle 1 having a driver 2 mounted on the respective ends thereof and having journals 3 adapted to be journalled in standard journal boxes (not shown), the boxes being disposed on the outside of the drive mechanism. A quill 4 having a gear wheel 5 secured at one end thereof is disposed around the axle 1 and the gear 5 is provided with a casing 6 to protect it from foreign matter and to provide a lubricating chamber therefor. The quill 4 is journalled in bearings 4ª of a drive motor, (not shown).

The gear wheel 5 is adapted to engage a driving pinion mounted on the end of a motor (not shown) whose shaft axis is in parallel alignment with the axis of the wheel axle 1.

The quill 4 is connected to the drive wheels 2 by a link mechanism which is attached to the gear wheel 5 and one of the driving wheels by means of a plurality of coupling rods. A pair of stud shafts 7, Fig. 4, are secured in the gear wheel 5 and similar shafts 8 are secured in the wheel 2. Crank arms 9 are pivotally mounted on the outer ends of the stud shafts 8 and a pair of coupling rods 10 are universally mounted by means of a knuckle joint 11 to the stud shafts 7 of the gear wheel and pivotally mounted at their other end to the crank arms 9 of the driver wheels, Figs. 1, 3 and 6.

A link 12, Fig. 1, having a relatively large central opening 13 is disposed around the axle member 1 on the outside of the drive wheel 2 and operatively connected to the crank arms 9 by pivot bolts 14. One end of the link member 12 is provided with a slotted opening 16 that is adapted to slidingly receive a cooperating plate member 17, Figs. 2, 5 and 6. Aligned rectangular openings 18 are provided in each side of the link 12 and in the plate member 17 to receive coil springs 15 in such manner that they will be compressed when the plate 17 is displaced longitudinally in either direction from its central or normal position within the slot 16. A relatively large clearance opening 19 is provided in each side of the link 12 for the pivot bolt 14 which is journaled in the plate 17 by means of a bushing 20. The relative movement of the parts 12 and 17 against the coil springs 15 provides a resilient connection between the cranks 9 and consequently the couplings 10 which connect the quill 4 to the driving wheels 2. This resilient connection is the equivalent of the flexible elements ordinarily disposed in the gear train connecting the quill to the drive motor.

One of the principal features of my invention is the provision of adequate lubrication to the movable parts of the universal link mechanism and to this end I provide lubricating chambers 22 and 23 in the drive wheel 2 and gear wheel 5, respectively, in proximity with the stud shafts. The stud shafts 7 and 8 are provided with axial and radial openings 24 and 25 which communicate with each other and with nozzles or feeder caps 26 that are readily accessible for connecting the same to feed means which may be temporarily connected until the lubricant is applied. All the wearing surfaces of the movable parts are interconnected by the communicating openings 24 and 25 with the lubricating chamber and the lubricant is fed thereto by centrifugal force during the operation of the drive mechanism.

The lubricating feature is very essential as these parts require constant and adequate lubrication to maintain them in the proper working condition and to prevent excessive wear which would otherwise result from the severe service conditions to which the mechanism is subjected.

The coupling rods 10 are also provided with lubricating chambers 28 which have openings 29 communicating with the bearings of the stud shafts 8.

It will be evident from the foregoing description of my invention that quill drives having a universal connection with the drive wheels of railway vehicles embodying the principles of my invention constitute a statically balanced, readily accessible, and flexible drive mechanism that is efficient in its operation and is adapted for high-speed locomotive service. It is further evident that the simplicity of the mechanical parts and their arrangement with all the linkage on the outside of the drive wheels together with the means for lubricating such parts constitutes a very practical design that insures long life of the drive unit and uninterrupted service.

Although I have described a specific embodiment of my invention, it will be obvious to those skilled in the art that various modifications may be made in the details of construction and in the design and proportion of the several co-operating parts without departing from the principles herein set forth.

I claim as my invention:—

1. In a railway vehicle drive, the combination with a pair of drive wheels, of a drive quill having its axis in parallel relation to the axis of said wheels, a pair of crank arms pivotally mounted on one of said wheels, a resilient link connecting said arms and a plurality of coupling rods pivotally mounted on said arms and secured for universal movement on said quill.

2. In a railway vehicle drive, the combination with a drive axle having a pair of drive wheels mounted on the respective ends thereof, of a drive quill disposed around said axle having a gear wheel mounted on one end thereof, a plurality of crank arms pivotally mounted on one of said pair of wheels, a link having a flexible element associated therewith pivotally mounted to said crank arms and a plurality of coupling rods pivotally mounted at one end to said arms and connected by a knuckle joint to said gear wheel.

3. In a railway vehicle drive, the combination with a drive axle having a pair of drive wheels mounted on the respective ends thereof, of a drive quill disposed around said axle having a gear wheel mounted on one end thereof, a plurality of crank arms pivotally mounted on one of said pair of wheels, a link having a central opening therein disposed around said axle and being pivotally mounted to said crank arms and a plurality of coupling rods pivotally mounted at one end to said arms and connected by a knuckle joint to said gear.

4. A flexible drive mechanism comprising a drive member and a driven member, a plurality of coupling rods connecting said members, supports for said rods and a resilient link connecting the supports of said rods.

5. A flexible drive mechanism comprising a drive member and a driven member, a plurality of coupling rods connecting said members, supports for said rods and a resilient link connecting the supports of said rods, said link and rods being symmetrically arranged and in balanced relation to said drive members.

6. A flexible drive mechanism comprising a drive member and a driven member, a plurality of coupling rods connecting said members, supports for said rods and a resilient link connecting the supports of said rods, said link and rods being symmetrically arranged and in balanced relation to said drive members, and said link having flexible elements associated therewith.

7. The combination with a drive axle having wheels mounted on the respective ends thereof, of a quill disposed around said axle having a gear wheel mounted on one end in proximity to one of said axle wheels, a plurality of crank arms pivotally mounted on said axle wheel, a resilient link pivotally connected to said arms, coupling rods connected respectively to said arms and gear wheel, and means for lubricating the joints of said arms, links and rods respectively.

8. The combination with a drive axle having wheels mounted on the respective ends thereof, of a quill disposed around said axle having a gear wheel mounted on one end in proximity to said axle wheels, a plurality of crank arms pivotally mounted on said axle wheel, a resilient link pivotally connected to said arms, coupling rods connected respectively to said arms and gear wheel, and means for lubricating the joints of said arms, links and rods respectively, said means comprising lubricant reservoirs having openings communicating with said joints.

9. The combination with a drive axle having wheels mounted on the respective ends thereof, of a quill disposed around said axle having a gear wheel mounted on one end in proximity to one of said axle wheels, a plurality of crank arms pivotally mounted on said axle wheel, a resilient link pivotally connected to said arms, coupling rods connected respectively to said arms and gear wheel, and pressure lubricating means for the joints of said arms, links, and rods, respectively.

10. The combination with a drive axle having wheels mounted on the respective ends thereof, of a quill disposed around said axle having a gear wheel mounted on one end in proximity to one of said axle wheels, a plurality of crank arms pivotally mounted on said axle wheel, a resilient link pivotally connected to said arms, coupling rods connected respectively to said arms and gear wheel, means for storing lubricant in said axle wheel and coupling rods and means for forcing the lubricant into the joints of all of said elements.

11. The combination with a drive axle having wheels mounted on the respective ends thereof, of a quill disposed around said axle having a gear wheel mounted on one end in proximity to one of said axle wheels, a plurality of crank arms pivotally mounted on said axle wheel, a resilient link pivotally connected to said arms, coupling rods connected respectively to said arms and gear wheel, means for storing lubricant in said axle wheel and coupling rods and means for forcing the lubricant into the joints of all of said elements by centrifugal force.

In testimony whereof, I have hereunto subscribed my name this 18th day of September, 1924.

CHARLES N. F. KNAPE.